(12) United States Patent
Klein et al.

(10) Patent No.: US 6,652,792 B1
(45) Date of Patent: *Nov. 25, 2003

(54) PROCESS FOR STAMPING DETERGENT BARS

(75) Inventors: Oliver Klein, Mannheim (DE); Mario Peter Neuhof, Hohenahr-Altenkirchen (DE); Hans-Juergen Solert, Bruhl (DE)

(73) Assignee: Lever Brothers Company, division of Conopco, Inc., New York, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/928,934

(22) Filed: Sep. 12, 1997

(30) Foreign Application Priority Data

Sep. 13, 1996 (GB) .............................................. 9619139

(51) Int. Cl.⁷ ........................ B29C 33/38; B29C 33/56; B29C 59/02; C11D 13/18; C11D 13/28

(52) U.S. Cl. ................. 264/219; 264/313; 264/320; 425/102; 425/385; 425/DIG. 44; 427/133; 427/135

(58) Field of Search .................. 264/319, 320, 264/325, 313, 219; 425/385, DIG. 44, DIG. 124, 102, 133, 135; 427/133

(56) References Cited

U.S. PATENT DOCUMENTS

| | | | |
|---|---|---|---|
| 567,734 A | * | 9/1896 | Clark |
| 2,714,226 A | * | 8/1955 | Alexrad ...................... 264/320 |
| 2,965,946 A | | 12/1960 | Sweet et al. |
| 3,248,758 A | | 5/1966 | Schmitz et al. |
| 3,534,440 A | | 10/1970 | Roberts |
| 3,616,126 A | | 10/1971 | Tungseth ...................... 161/53 |
| 4,271,116 A | * | 6/1981 | Jones ........................ 264/221 |
| 4,562,032 A | | 12/1985 | Gaudreau |
| 4,602,060 A | | 7/1986 | Clark et al. .................. 524/745 |

(List continued on next page.)

FOREIGN PATENT DOCUMENTS

| | | |
|---|---|---|
| EP | 111 100 | 6/1984 |
| EP | 276 971 | 8/1988 |
| EP | 480 738 | 4/1992 |
| GB | 746 769 | 3/1956 |
| GB | 953458 | 3/1964 |
| GB | 1449774 | 9/1976 |
| GB | 1 570 780 | 7/1980 |
| GB | 2 276 345 | 9/1994 |
| WO | WO 88/07573 | 10/1988 |
| WO | WO 88/09716 | 12/1988 |
| WO | WO 96/00278 | * 1/1996 |
| WO | 96/00278 | 1/1996 |

OTHER PUBLICATIONS

International Search Report dated Feb. 11, 1998.
Handbook of Adhesion. Packham, D.E., Polymer Science & Technology Series, pp. 395–399.
UK Search Report dated Oct. 29, 1996 in GB 9619139.0.

*Primary Examiner*—Jan H. Silbaugh
*Assistant Examiner*—Michael I. Poe
(74) *Attorney, Agent, or Firm*—Gerard J. McGowan, Jr.

(57) ABSTRACT

In a device for handling plastic material, such as a stamping device for stamping detergent bars, an elastomeric layer is provided on the handling surface which has good adhesion to the handling surface and good release from the plastic material. The elastomeric layer comprises at least two elastomeric coatings of different properties and/or compositions.

4 Claims, 1 Drawing Sheet

U.S. PATENT DOCUMENTS

Figure 1:
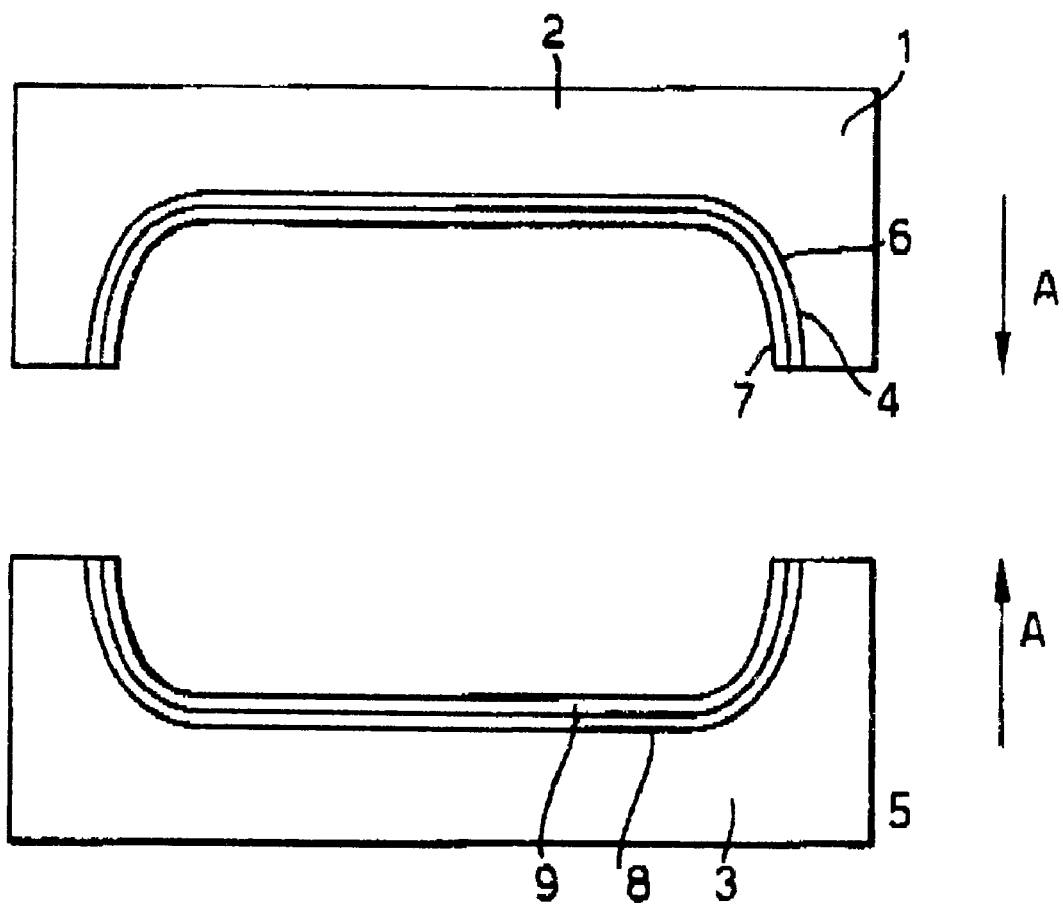

| | | |
|---|---|---|
| 4,793,959 A | 12/1988 | Adams et al. |
| 4,822,273 A * | 4/1989 | Adams ........................ 425/385 |
| 4,919,388 A * | 4/1990 | Koike et al. ................. 249/115 |
| 5,074,196 A | 12/1991 | Michalovic et al. ......... 92/98 R |
| 5,219,511 A * | 6/1993 | Fennessy, Sr. ............... 264/225 |
| 5,269,997 A | 12/1993 | Leslie |
| 5,330,339 A * | 7/1994 | Gatarz ........................ 425/116 |
| 5,470,608 A * | 11/1995 | Watanabe et al. ........... 427/133 |
| 5,648,109 A | 7/1997 | Gutkowski et al. |
| 5,653,933 A * | 8/1997 | Heinz et al. .............. 264/297.5 |

* cited by examiner

PROCESS FOR STAMPING DETERGENT BARS

The present invention relates to a device, process and apparatus for stamping a plastic material using a die to form a shaped article. In particular, it relates to process for stamping a detergent bar.

By "detergent bar" is meant a tablet, cake or bar in which the level of surface active agent, which comprises soap, synthetic detergent active or a mixture thereof, is at least 20 wt % based on the bar.

In the manufacture of detergent bars, a preformed composition comprising all components of the bar is typically extruded from a nozzle to form a continuous "rod" which is cut into smaller pieces of predetermined length, commonly referred to as "billets". The "billets" are then fed to a stamper or, alternatively, are given an imprint on one or more surfaces using, for example, a die of the same dimensions as the bar surface which is hit with force such as with a mallet or a die in the shape of a roller.

Stampers typically have a die formed in two halves each with a surface which contacts the billet during the stamping operation. These surfaces are adapted to close to a preset separation distance, thereby compressing the billet between the die halves to give the bar its final shape and appearance, and then separate. Excess composition is squeezed out from the die halves as they close. This is commonly referred to as "flash". The flash is then separated from the soap bar by transferring the bar through holes in a "deflashing plate".

Conventional die stamping machines include "pin die" shape machines in which a pair of opposing die members or die halves meet during a compaction step and a "box die" machine in which a pair of opposing die members stamp a bar held within a through-opening in a box frame but do not meet during compaction, the peripheral face of the bar being restrained by the box frame.

The die halves are often each provided with a die or ejector insert. These are normally held closed within the die halves by springs but can be pushed open by compressed air or mechanical means to assist in the release of the bar from the die. During closing of the die halves vacuum can be applied to remove air trapped in the die cavity between the detergent bar and die surface and, in the case of rotary dies, this vacuum assists in retaining the bars in place during rotation.

Stamping of detergent bars using a die is carried out to give the bars a reproducible shape, smooth surface and/or to imprint a design such as a logo, trade mark or the like onto at least part of a surface of the bar.

However, as a result of die-blocking, i.e. amounts of residual detergent left on die halves which builds up during continued use of the dies, bars are often formed with visible imperfections on their surfaces or they may not release from the die surface.

Numerous solutions to these problems have been proposed. One solution involves chilling the die halves during the stamping operation.

Another solution is described in GB-A-746 769 which discloses a die set which includes a die box and a pair of companion die members made of plastic materials comprising polymers with a specified modulus of elasticity. A disadvantage with this system is that a die release agent is necessary to prevent detergent from adhering to and building up on the dies and marring the surfaces of subsequently pressed bars.

Another solution is proposed in EP 276 971 which involves the use of two die members, each comprising a non-elastomeric and an elastomeric part. The elastomeric part, which contacts the soap bar during the stamping process, comprises an elastomer coating having a modulus of elasticity within a specified range.

International patent application WO96/00278 describes a method and apparatus of stamping a detergent bar in which die members comprising a non-elastomeric part and an elastomeric part of thickness less than 200 microns are used. This is found to be particularly easy to maintain, as the thin elastomeric layer is readily applied and replaced.

Problems have been experienced with elastomeric coatings applied to non-elastomeric dies over long periods of use. It has been found that some elastomeric layers tend to separate from the non-elastomeric die. It has been found difficult to provide an elastomeric layer which has good adhesion to the non-elastomeric die but which has good release characteristics as well.

It is an object of this invention to overcome at least some of the above problems.

We have now found an alternative device that can be used to produce bars such that surface decoration can be achieved in an easy reproducible manner.

Hereinafter "surface decoration" is meant a uniform shape, smooth surface, a design such as a logo, trade mark or similar.

The present inventors have discovered that the use of a plurality of separately formulated and polymerized elastomeric layers can be used to optimise adhesion to the non-elastomeric die or similar structure and release properties of the layer contacting the detergent.

Accordingly, the present invention provides a process for forming an elastomeric coating on a device for stamping or handling a plastic material comprising the steps of:

treating the device by chemical and/or mechanical means to form a bonding surface for said elastomeric coating;

forming on said bonding surface a first solidified elastomeric coating of selected composition under selected conditions; and forming on said first solidified elastomeric coating at least one second solidified elastomeric coating of separately selected composition under separately selected conditions. With the invention, the properties and composition of each elastomeric coating can be tailored to give the desired properties. For example, the first solidified elastomeric coating can be made to have good adhesion to the bonding surface and resistance to forces involved in stamping and release. This would tend to give it poor release properties. However, the solidified elastomeric coating for contacting the plastic material can be tailored to have good adhesion to the underlying elastomeric coating (which is an easier bond to form than the bond to the bonding surface) and good release properties.

If necessary, a plurality of solidified elastomeric coatings of graded composition and/or properties (such as hardness, or adhesiveness) can be provided, each having the desired good adhesion to the underlying elastomeric coating and the final elastomeric coating having good release properties with the plastic material.

The present invention further provides a device for stamping or handling a plastic material, which device includes at least one contact surface which will contact the plastic mass, wherein at least one contact surface is provided with an elastomeric layer comprising at least two elastomeric coatings, the elastomeric coatings being of different composition and/or properties.

Each elastomeric coating must be able to withstand the conditions under which subsequent coatings are solidified.

By "elastomeric" according to the invention is meant a material as defined in ISO (International Standard Organisation) 1382 as an "elastomer", or a "rubber". Also included in the definition of "elastomeric" materials according to the invention are thermoplastic elastomers and copolymers and blends of elastomers, thermoplastic elastomers and rubbers.

Elastomers are defined as polymers with long flexible chains, independent in the raw material and transformed via vulcanising or crosslinking agents which introduce crosslinks and form a crosslinked network structure. The network structure retains the movement of the macromolecular chain molecules and as a result returns rapidly to approximately its initial dimension and shape after deformation by a force and release of the force.

With increasing temperature an elastomer goes through a rubbery phase after softening and retains its elasticity and elastic modulus until its decomposition temperature is reached.

Thermoplastic elastomers consist of amorphous and crystalline phases. The amorphous phase has a softening range below ambient temperature and thus acts as an elastic spring whilst the crystalline segments whose softening range is above ambient temperature, act as crosslinking sites.

The composition of the materials from which the elastomeric coatings are made may be separately controlled for each coating. The coatings may be foamed. For example, different starting materials, or different blends of starting materials, may be selected. Varying quantities of curing agents are preferably used.

Alternatively, the conditions under which each elastomeric coating is solidified may be controlled. For example, the temperature, pressure (vacuum, may be used if necessary) and/or catalyst system may be varied separately for each elastomeric coating. The use of radiation or ultra violet light may also be used variably as desired.

The elastomeric coatings may have undergone differing pretreatments before curing, such as dilution with differing quantities of solvent.

The first solidified elastomeric coating is preferably formed of a material which has good adhesion to the bonding surface. It may be formed under relatively high pressure and temperature. For example, a pressure in the region 10–100, preferably 20–60, most preferably about 40 bar gauge may be used. The temperature may be around 200° C.

The elastomeric coating for contacting the plastic material may be cured under conditions of lower pressure and/or temperature, preferably at atmospheric pressure. Elastomeric coatings, if presents intermediate these two coatings may be cured under conditions of temperature and/or pressure intermediate the conditions under which these two coatings are formed.

Preferably the elastomeric coatings according to the invention are selected from those classes described in American Society for Testing and Materials D1418 which include:

1. Unsaturated carbon chain elastomers (R Class) including natural rubbers eg Standard Malaysian Rubber; butadiene eg "BUNA"™ type ex Bunawerke Huls; and butadiene acrylonitrile copolymer eg "Perbunan"™ ex Bayer.
2. Saturated carbon chain elastomers (M Class) including ethylene-propylene types eg "Nordel"™ ex DuPont and fluorine containing types eg "Vitron"™ ex DuPont.
3. Substituted silicone elastomers (Q Class) including liquid silicone rubbers eg Silastic 9050/50 P (A+B)™ ex Dow Corning.
4. Elastomers containing carbon, nitrogen and oxygen in the polymer chain (U Class) including polyurethanes eg polyurethanes ex Belzona.

Suitable elastomeric coatings can be obtained from materials such as liquid silicone rubbers such as Silastic 9050/50 P A+B (ex Dow Corning) which after curing has a modulus of elasticity about 2–3 Mpa; and polyurethanes, for example Belzona PU2221, as hereinafter defined, which after curing has a modulus of elasticity of about 9 mPa, and Belzona 2131 (MP Fluid Elastomer), a 2 part product based on a diphenylmethane 4,4'-diisocyanate (MDI) system with a phenylmercuric neodecanoate catalyst.

The "elastomeric" material, as hereinbefore defined, may be pretreated, such as by forming a solution of a commercially available elastomer, prior to it being applied as a coating on the die surface. The elastomers, rubbers, and copolymers and blends thereof are cured or crosslinked, in-situ. For example, the components including the base elastomeric material, cross-linking agents and other materials such as accelerators may be mixed prior to application as a coating. Once applied to the die the coatings are cured in-situ. This may be aided by the application of heat or other accelerating processes, for example pressure, radiation or UV light.

In some cases, materials may be dissolved with an appropriate solvent, applied to the die and the solvent subsequently driven off.

In the case of thermoplastic materials, they can be heated to melt condition applied to the die, cooled and resolidified.

Materials suitable as elastomeric coatings in the present invention will preferably have a modulus of elasticity, in the range 0.1 to 50 MPa, most preferably 1 to 35 MPa.

Preferably, the elastomeric coatings closer the sounding surface will have a higher modulus of elasticity than those close to the surface.

The modulus of elasticity of the elastomeric layer comprising the individual elastomeric coatings is preferably in the range 0.1 to 50 MPa.

The modulus of elasticity of an elastomeric layer on coating may be measured by recording the force required to indent the coating as a function of the indentation depth. Typically an indentor with a spherical top may be employed and the slope, s, of the force as a function of the indentation depth to the power 3/2 is determined. The indentation depth is the movement of an indentor into the coating after it first contacts the surface of the coating. In general, it is necessary to correct the measured indentation depth for the compliance of the measurement apparatus. That is, the actual indentation depth, d, is related to the measured apparent value d' by the following expression $$d = d' - (F \cdot C)$$

where F is the indentation force. The compliance C is determined by compressing the indentor against a rigid surface and recording the apparent displacement as a function of the applied force which has a slope equal to C. The modulus of elasticity E is calculated from the following expression $$E = \tfrac{3}{4} s \cdot \sqrt{R^{1}} \cdot (1 - b^2),$$

where $s = F/d^{3/2}$, R is the radius of the spherical tip of the indenter and b is the Poisson's ratio of the coating which is equal to about 0.5 for elastomers.

Under certain conditions to be described hereafter, the above indentation method may give falsely large values of the elastic modulus due to the influence of the rigid material onto which the coating is applied. In order to safely avoid this problem it is necessary to ensure that the contact radius of the indentor with the coating does not exceed about 1/10 of the thickness of the coating. The contact radius, a, is related to the indentation depth by the following expression $$a = \sqrt{d} \cdot \sqrt{R}$$

For coatings less than 200 μm, it is recommended that a nano-indenter is used which is capable of measuring indentation forces at small indentation depths using indentors with tips having a small radius. An example of such equipment is the "NanoIndenter II"™ (Nano-instruments). The alternative is to make thick (greater than 200 μm) test coatings so that more conventional measurement equipment such as an Instron tester, (eg Model 5566) may be employed.

Preferably, the total elastomeric coating thickness is small, being preferably less than 200 μm as in WO 96/00278.

An advantage of the elastomeric coatings being thin is that they can easily be applied in a factory to a conventional die with a built in logo. For example they can be applied using a brush or spraying techniques such as air assisted, airless or electrostatic spraying. A combination of techniques may also be used, if necessary. This may be so where it is necessary to apply coatings of different thicknesses on different parts of the die. For example, if a particular thickness is required in a finely detailed region on the die, for example the logo, a spray technique can be used with the logo ejector removed from the main body of the die.

The coatings can be cured on the die at ambient temperature or elevated temperatures depending on the type of elastomeric material and desired properties. Higher temperatures can be employed to drive off solvent in solvent borne elastomers. Other methods such as ultra violet light curing can be employed to hasten the curing process.

The elastomeric coatings can be applied to conventional dies. Typically with thick coatings when the elastomeric part becomes worn or damaged through use resulting in, for example, marking of the stamped detergent bar the coating has to be removed; the die cleaned and the new coating prepared and remoulded to the die surface using specialist equipment. By contrast, this elastomeric coating can easily be recoated on site simply by removing, for example, by mechanical means the old coatings with the aid of an appropriate chemical treatment (eg using a solution of potassium hydroxide in a mixture of ethanol and toluene in the case of silicone coatings and ethanol and/or methanol in the case of polyurethane coatings), treating the die surface and replacing the old coatings with new material. This results in considerable savings both in terms of the loss of production time and the cost of recoating.

Preferably the die comprises a rigid material selected from metals and their alloys, for example brass and other copper alloys and steels including carbon and stainless steel; and other non-elastomeric materials such as thermosetting and thermoplastic resins, for example polyester, epoxy resins, furan resins; hard cast polyurethanes; ceramics; composites and laminates.

The die must be able to withstand the conditions under which the elastomeric coatings are solidified.

Additional materials, for example fillers, can be added to the elastomeric material to modify its mechanical and processing properties. The effects of filler addition depend on the mechanical and chemical interaction between the elastomeric material and the filler.

Fillers can be used to modify the elastomeric material such that desirable properties, for example tear resistance, is achieved. Suitable fillers include carbon blacks; silicas; silicates; and organic fillers such as styrene or phenolic resins.

Other optional additives include friction modifiers and antioxidants.

Preferably, the elastomeric coatings each have a thickness within the range of 1 to less than 200 microns, preferably at least 10 to 150 microns, most preferably at 15 to 100 microns. At thicknesses below 1 micron, uniform coverage of the elastomeric coating on the die surface may not be obtained.

The properties of the elastomeric layer can be varied according to the detergent bar composition, processing temperature and/or process parameters such as shape of the cavity in the die halves, speed of the stamping equipment and separation distance of the die halves, in order to achieve the desired result, for example good release of a detergent bar from the die. It has been found that for a particular bar composition in combination with a simple logo free die, elastomeric layers at the lower end of the thickness range as defined and the upper end of modulus range can achieve acceptable die release.

However, for the same composition with a complex logo bearing die or a complex die shape acceptable die release is achieved with a elastomeric layer closer to the upper end of the thickness range and with a lower modulus. Similarly, for a bar composition which is inherently more difficult to stamp acceptable die release may be achieved with a elastomeric layer closer to the upper end of the thickness range and a lower modulus of elasticity.

The device according to the invention can be used to stamp a detergent bar comprising a surface active agent which preferably comprises substantially soap or a synthetic detergent or a mixture of soap and synthetic detergent. It finds particular application in the stamping of soft and/or tacky detergent bars which contain synthetic surfactants, translucent and transparent soap bars having a reduced fatty matter content, for example, in the range 63–78% wt with respect to the total bar weight and those bars containing skin beneficial agents such as humectants polyols, oils, fatty acids and fatty alcohols.

Preferably, the first elastomeric coating is bonded to the die stamping surface by mechanical and/or chemical means to increase the adhesion between the die and the first coating.

The die surface may be subjected to a number of pre-treatments prior to coating with the elastomeric material, to improve the bond strength between the die surface and the first coating. These pre-treatments aim to remove weak boundary layers for example weak oxides on metals; optimise the degree of contact between surface and coating and/or alter the surface topography such that the bondable surface area is increased, and to protect the die surface before bonding. Suitable techniques can be divided into three main groups:

1. Mechanical Abrasion—techniques include wire brushing, abrasion paper, blasting techniques such as water, grit, sand and glass bead blasting, polishing such as diamond polishing and spark erosion.
2. Chemical Treatment—including solvent cleaning, etching for example using acid, anodising, and use of a primer or adhesive bonding chemical for example a silane or silicone.
3. Energetic Surface Pretreatment: More widely used with non-metallic systems, techniques include corona discharge, plasma, and laser techniques.

Further, various combinations of the above techniques may be employed to pre-treat the bonding surface.

In addition to being applied to the bar stamping surface of the die, the elastomeric coating may advantageously be applied to other parts of the stamping device and other machinery in the soap processing line. For example, it may be applied to the "deflashing plate", which separates the stamped bar from the excess extruded bar composition, die ejectors, grippers, the backing plate on which the die is mounted as well the non-stamping surfaces of the die. The invention can also be used on containers for intermediate products in soap bar manufactures, such as the cups of product chains (eg for packing machines, wrapping machines etc). The stamping device may be any known suitable stamping device, for example as shown in EP 276971.

The present invention will be further described by way of example only with reference to the accompanying figure which is schematic cross section through a die according to the present invention.

The figure shows a die 1 comprising two die halves. Each die half comprises a rigid member 2, 3. Each die half is provided, on bar stamping surfaces 4 and 5, with two elastomeric coatings in sequence 6 and 7, 8 and 9. The two die halves 2 and 3 are generally identical. A logo (not shown) may be formed on one or both of the die stamping surfaces if required.

The die halves may be used to stamp a detergent bar (not shown) by moving them towards one another in the direction of the arrows A as shown.

EXAMPLES

A detergent bar handling surface was treated with a first and second elastomeric coating according to the invention as follows.

Example 1

A detergent bar stamping die was produced with a bonding surface formed in brass, aluminium and stainless steel for testing. The stamping die is first of all given the desired shape by milling, spark machining and glass blasting in a manner known in the art.

At the same time, a copper block is formed whose shape and size corresponds to the shape of the soap bar to be formed. The copper block fits within the stamping surface of the die with a gap of size 0.05 mm defined between them.

The stamping die is treated with the primer F2260 ex-Dow Corning.

The first elastomeric coating is formed from a silicone WS27-60-29 ex-Dow Corning. This product is based upon vinyl VMQ (Vinylmethylpolysiloxane) filled with silica. DHBP (2,5-bis-(tert-butyl peroxy)-2,5-dimethylhexane is used as cross linking agent in a concentration of 1.8 parts per 100 parts of base material.

After the silicone has been pressed manually into the die, the positive copper block is pressed into the die so that the silicone is accurately pressed into the die with the layer thickness determined.

This layer of silicone is then cured with the application of pressure and heat. The copper model remains in the die during the process. The silicone is cured at a temperature of 200° C., and a pressure of 750 to 1,000 bar for one half hour. The cured silicone attains a hardness of about 60–100 shore, and a thickness of approximately 50 micron.

The die, together with the copper block is then cooled or quenched.

Subsequently, the cooled die is coated directly with the silicone required for the second elastomeric coating. The second elastomeric coating thickness is of the order of 0.05 mm.

A vinyl-container methypolysiloxane polymer with reinforcing filler based on pyrogenic silica has been found to be suitable. A curing system comprises silane and platinum cross linking agent (ex Dow Corning, silastic 9050-50P parts A and B). The viscosity of this silicone is around 500 mPas.

The die is then heated to 200° at atmospheric pressure and cured for half an hour.

The resulting multi layer elastomeric coating is found to have very good adhesion to the die—it can not be removed even with a knife.

A die as produced by the above method was then used to stamp detergent bars. A Mazzoni STUF stamping machine was used. The results were compared with a single silicone layer coated stamping die mounted in the same machine.

The detergent composition stamped is that sold under the trade mark DOVE produced by Unilever.

After half an hour, it was found that soap bars became stuck in the die coating with a single elastomeric layer and edge damage appeared in the coating on the stamping die.

Cracks were found in the coating of the single elastomeric layer coated die and the coating had partially separated from the die especially in the marginal regions.

Dies coated by the multi layer technique showed no signs of wear or blocking of the die.

Example 2

The method according to Example 1 was used to apply a two layer elastomeric coating to an aluminium carrier for soap bars in the product chain of a cartoning machine.

For comparison, a first comparative example comprising a carrier coated with a hard single layer elastomeric coating and a second comparative example comprising a carrier having a soft single layer elastomeric coating were prepared, using the method of WO 96/00278. The cartoning machine was then run for one month with the carrier according to the invention and the comparative examples.

After one month, it was Found that the soft single layer elastomeric coating was starting to separate from the aluminium carrier. The hard single layer elastomeric coating showed no sign of damage, but was starting to damage the detergent bars themselves. The double layer elastomeric coating according to the present invention showed no sign of damage and did not damage the detergent bars.

What is claimed is:

1. Process for stamping a detergent bar comprising stamping the bar with a device comprising a die; the die comprising a rigid material selected from the group consisting of metals, alloys of the metals, and other non-elastomeric materials; the die further including a contact surface for contacting the bar; the contact surface having an elastomeric layer comprising at least two elastomeric coatings: at least two of the elastomeric coatings being of different composition and properties; one of the elastomeric coatings having good adhesion to a bonding surface of the rigid material of the die; and the elastomeric coating which contacts the bar having good release properties.

2. The device according to claim 1 wherein the modulus of elasticity of the elastomeric layer is in the range of 0.1–50 Mpa.

3. The process of claim 1 wherein said device is formed by:

treating a surface of the rigid material of the die by chemical and/or mechanical means to form the bonding surface for said one of the elastomeric coatings having good adhesion to the bonding surface;

forming on said bonding surface a first solidified elastomeric coating of selected composition under selected conditions, said first solidified elastomeric coating corresponding to said one of the elastomeric coatings having good adhesion to the bonding surface; and forming on said first solidified elastomeric coating at least one second solidified elastomeric coating of separately selected composition under separately selected conditions.

4. The process according to claim 3 wherein the first and second elastomeric coatings are solidified under different conditions of pressure and/or temperature and/or catalyst system.

* * * * *